United States Patent [19]

Wong et al.

[11] Patent Number: 4,735,683
[45] Date of Patent: Apr. 5, 1988

[54] PROCESS FOR PREPARATION OF POTASSIUM SALTS FROM PULP OF LIGNOCELLULOSIC MATERIALS

[75] Inventors: Alfred Wong, Beaconfield; Gary D. Derdall, Saskatchewan, both of Canada

[73] Assignee: Potash Corporation of Saskatchewan, Saskatchewan, Canada

[21] Appl. No.: 868,096

[22] Filed: May 28, 1986

[30] Foreign Application Priority Data

May 28, 1985 [CA] Canada ................................. 482516

[51] Int. Cl.$^4$ ..................... D21C 11/00; D21C 11/12; D21C 3/04; D21C 3/02
[52] U.S. Cl. ...................................... 162/14; 162/16; 162/29; 162/301; 162/30.11; 162/31; 162/32; 162/83; 162/86; 423/DIG. 3
[58] Field of Search ................... 162/14, 16, 29, 30.1, 162/31, 32, 36, 83, 86, 90, 163; 530/500; 423/DIG. 3

[56] References Cited

U.S. PATENT DOCUMENTS

| | | |
|---|---|---|
| 1,303,916 | 5/1919 | Kermer et al. |
| 2,308,364 | 1/1943 | Hatch |
| 2,623,040 | 12/1952 | Keilen et al. ........................ 530/500 |
| 3,020,195 | 2/1962 | Casciani et al. ........................ 162/32 |
| 3,728,438 | 4/1973 | Nasyrov |
| 3,944,463 | 3/1976 | Samuelson et al. |
| 4,249,990 | 2/1981 | Gilbert et al. |

FOREIGN PATENT DOCUMENTS

| | | |
|---|---|---|
| 263181 | 8/1926 | Canada |
| 548842 | 11/1957 | Canada |
| 640009 | 4/1962 | Canada |
| 992266 | 7/1976 | Canada |

OTHER PUBLICATIONS

Nikitin et al., "Precipitation of Alkali Lignin by Carbon Dioxide Under Pressure", translated from Bumaznaya Promyshlenhost, v. 38, No. 5, 1964, pp. 14-15.

*Primary Examiner*—Peter Chin
*Assistant Examiner*—Thi Dang
*Attorney, Agent, or Firm*—John P. White

[57] ABSTRACT

Described herein is a process for producing potassium salts from potassium-based liquors for pulping of lignocellulosic material. The process comprises the steps of
(a) digesting lignocellulosic material with a potassium-base aqueous cooling liquor to obtain an aqueous slurry of partially delignified pulp of the lignocellulosic material;
(b) separating the pulp from the spent potassium-base aqueous cooling liquor;
(c) concentrating the spent pulping liquor; and
(d) recovering potassium salts including potassium carbonate, potassium sulphate and potassium lignosulphonate from the concentrated spent pulping liquor. The recovered potassium salts find numerous uses, an example being use in fertilizers.

11 Claims, No Drawings

PROCESS FOR PREPARATION OF POTASSIUM SALTS FROM PULP OF LIGNOCELLULOSIC MATERIALS

BACKGROUND OF THE INVENTION

1. Field of the Invention

The present invention relates to a process for the manufacture of potassium salts and particularly, to a process for the preparation of potassium salts from the spent liquor made in the pulping of lignocellulosic materials.

2. Description of the Prior Art

The major alkaline pulping processes for the manufacture of chemical pulps are sodium-based processes. In larger pulp mills, spent pulping chemicals are recovered and regenerated through well known means. In a typical process sequence, spent pulping liquor is collected, concentrated and burned in a smelter-type furnace under reducing conditions. The resulting solid combustion products composed of sodium sulphide and sodium carbonate are dissolved in water for subsequent conversion to suitable sulphite cooking liquors. See, for example, U.S. Pat. Nos. 3,098,710 (Ahlborg and Cederquist), 3,508,863 (Kiminki and Keskinen), and 4,049,787 (Romantschuk and Vuojolainen). In another common approach, the concentrated spent pulping liquor is burned in a fluid-bed reactor under oxidative conditions. See, for example, U.S. Pat. Nos. 3,674,630 (Copeland) and 3,927,174 (Copeland). The end products of fluid-bed combustion are sodium sulphate and sodium carbonate. Because the product is neither pure sodium sulphate nor pure sodium carbonate, the market for this product mixture is very uncertain. For example, the glass industry would prefer to purchase a product that contains mostly sodium carbonate. In contrast, the detergent industry would desire a product that contains mostly sodium sulphate. Moreover, there are numerous low-cost sources of pure sodium sulphate and sodium carbonate. Furthermore it is well known from the phase chemistry of sodium sulphate and carbonate that a commercial scale separation is not practicable. Under these technical and market constraints, the resulting economic return for the pulp mill practising such technology of spent liquor disposal is often not satisfactory.

Casciani et al. (U.S. Pat. No. 3,020,195) have disclosed a process by which excess potassium sulphate is added to a recovery furnace burning waste liquor produced in a potassium-based kraft or sulphite pulping process. The object was to co-produce potassium carbonate for external sales, using the pulp mill's chemical recovery facilities. Casciani teaches the addition of potassium sulphate to a recovery furnace burning kraft (or sulphite) waste pulping liquor. Under reducing conditions, potassium sulphide and potassium carbonate are produced. Upon subsequent causticization, a kraft cooking liquor consisting of potassium hydroxide and potassium sulphide is made. In the auxiliary furnace operating under oxidizing conditions, potassium sulphate and potassium carbonate are made. Potassium sulphate would then be preferentially separated from the mother liquor for use as feed to the main reducing furnace. The potassium carbonate remaining in the mother liquor would be used for external purposes.

Materials balance considerations suggest that this scheme is impractical. With the selective removal of potassium as potassium carbonate, the excess sulphur in the potassium sulphate input will accumulate preferentially in the mill's pulping liquor system. The tolerable limit of sulphidity in the pulping liquor will be exceeded.

The amount of potassium carbonate that can be recovered for external usage will be in direct proportion to the amount of potassium sulphate needed to make up for the process losses of potassium and sulphur. If potassium is removed selectively, in whole or in part, as potassium carbonate, then the disposal of the residual sulphur entering the mill chemical circuit could become a very serious problem. And if the excess sulphur input can not be removed separately, e.g., via the flue gas, the sulphur content of the cooking liquor will increase rapidly. The sulphidity of kraft pulping liquor has strict limits for efficient pulping operations.

With increasingly stringent control of gaseous sulphur emissions in recent years, the requirement for sulphur-based chemical makeup (i.e., potassium sulphate in the present case) has declined considerably. The potassium/sulphur loss ratio is no longer in the same ratio as in potassium sulphate. In fact, kraft mills are now using hydroxide or carbonate type makeup chemicals to replace the loss of the pulping cation: sodium or potassium as the case may be. The required (smaller) make-up of sulphur is being supplied, in some cases, in the form of elemental sulphur. In the Casciani concept, the production of extra potassium carbonate would not be feasible, if potassium sulphate could not be used by kraft mills as make-up chemical.

Furthermore for the small pulp mills having production capacity of 300 or less tonnes of pulp daily, the economics of all above-mentioned chemical recovery methods are even less attractive. In particular, for sulphite pulp mills producing higher yield pulps, the spent pulping liquor with a low ratio of organic to inorganic substances is not technically amenable to burning without the use of supplementary fuels.

And yet, ex-plant effluent treatment of the said spent pulping liquor is an expensive alternative without any economic returns. Moreover, the sale of spent pulping liquor in the open market faces severe competition in terms of price and volume.

The use of potassium-base for the chemical pulping of lignocellulosic material has been known for many years to those skilled in the art. Yamada et al., Japan Patent Kokai No. 86,808/78, discloses the use of potassium hydroxide and molecular oxygen for the delignification of non-woody plant material such as straw and esparto grass. Friese, German Pat. No. 2,365,480, teaches a two-stage process using potassium hydroxide and sulphuric acid to obtain lignin and pulp from hardwoods. Commercialization of these and other approaches has not been realized because of the significantly higher prices of potassium hydroxide and potassium carbonate in comparison to sodium hydroxide and sodium carbonate respectively, as chemical makeup. Gilbert et al., U.S. Pat. No. 4,249,990, discloses a method for the removal of wood-originated potassium compounds from a sodium-base kraft mill pulping liquor system. The potassium compounds interfere with the operation of the closed-cycle kraft mill described by Rapson in U.S. Pat. No. 3,698,995. Gilbert et al., Canadian Pat. No. 1,113,207, teaches the substitution of sodium base with a potassium base in the kraft pulping process, to eliminate the needs for kraft mills to remove extraneous potassium compounds from its cooking liquor system. Build-up of potassium compounds in a sodium base kraft pulp mill arises from the relatively high concentration of potassium in the natural wood.

SUMMARY OF THE INVENTION

A process has been discovered, in accordance with this invention, for the manufacture of commercially important potassium compounds, which comprises the steps of: (a) digesting lignocellulosic material with an aqueous solution of potassium-base cooking liquor, and (b) recovering the spent pulping liquor for the preparation of potassium salts which include potassium lignosulphonate, potassium carbonate and potassium sulphate.

The process of the present invention involves the replacement of sodium compounds conventionally used in the sulphite pulping of lignocellulosic material with the corresponding potassium compounds such as potassium hydroxide, potassium carbonate, potassium sulphite, potassium bisulphite, etc. The resulting spent sulphite liquor is concentrated and oxidized to obtain and precipitate potassium sulphate. The residual spent liquor may be further concentrated to recover potassium lignosulfonate. The use of potassium compounds instead of sodium compounds in the sulphite process does not appear to influence the quality of the resulting pulp. By using the more expensive potassium compounds the resulting spent sulphite liquor is of higher value, thus making it economically feasible even for smaller plants to process the spent liquor for recovery of valuable potassium sulphate and potassium lignosulfonate.

In the present invention, we (i) use potassium hydroxide or potassium carbonate for the preparation of a suitable liquor for the cooking of cellulosic materials and (ii) produce potassium sulphate, potassium carbonate and potassium lignosulphonate. The mill's liquor preparation circuit may be completely open, depending on the prevailing economics of potassium carbonate, potassium sulphate and potassium lignosulphonate. Our system would not cause a liquor sulphidity control problem, under any circumstances.

In accordance with the present invention, therefore, we provide a process for the manufacture of potassium salts from potassium-based liquors for pulping of lignocellulosic material. This process resides in an improvement in a process for pulping of lignocellulosic material which comprises the steps of (a) digesting lignocellulosic material with a potassium-base aqueous cooking liquor to obtain an aqueous slurry of partially delignified pulp of said lignocellulosic material; and (b) separating said pulp from the spent potassium-base aqueous cooking liquor;

which improvement comprises the further steps (c) concentrating said spent pulping liquor; and (d) recovering potassium salts including potassium carbonate, potassium sulphate and potassium lignosulfonate from said concentrated spent pulping liquor.

In one embodiment of this invention, the spent potassium-based pulping liquor is burned under oxidizing conditions to produce a mixture consisting principally of potassium carbonate and potassium sulphate. This mixture is then leached to remove the much more soluble potassium carbonate, leaving behind potassium sulphate.

The potassium carbonate can be used for the preparation of fresh pulping liquor, and the potassium sulphate could be marketed, for example, as a valuable fertilizer.

Our approach is very different from that of Casciani et al. The present invention would allow the complete removal of virtually all potassium and sulphur inputs from the mill's spent pulping liquor system, as valuable agricultural and industrial chemicals.

When the present invention is practised, a pulp mill would be able to produce pulp of satisfactory papermaking properties and chemical products which can be marketed readily for use in other agricultural and industrial concerns. The relatively higher cost of potassium-base pulping chemicals could readily be offset by the economic return achieved from the sales of value-added chemical products produced concomitantly. Another advantage attendant to potassium-base pulping in accordance with the present invention is the elimination of the accompanying water pollution problem arising from the disposal of spent pulping liquor.

DETAILED DESCRIPTION OF THE INVENTION

The lignocellulosic materials used in the pulping process of the present invention can be either softwoods or hardwoods, or other varieties of fibrous, non-woody lignocellulosic material, for example, wheat straw. They can be employed in the form of chips, wafers, slivers, etc.

The lignocellulosic material is placed in a pressure vessel, i.e., a closed reaction vessel or digester, to which is added a potassium-based pulping liquor. The liquor may be any one of potassium hydroxide, potassium carbonate, potassium sulphide, potassium sulphite, potassium bisulphite or combinations thereof. The pH of the initial pulping liquor may range anywhere from less than 1 to above 13. The concentration of pulping liquor and the quantity of pulping liquor to the quantity of lignocellulosic material to be digested may be varied according to well-known practices, for example, in accordance with the corresponding sodium-based pulping procedures. The reaction, i.e. digestion is conducted at times, temperatures, and pressures which are well-known to those skilled in the art of chemical pulping.

After completion of the digestion with pulping liquor, the partially delignified material is discharged from the reactor and the spent pulping liquor is displaced from the insoluble lignocellulosic material by washing with water or other suitable aqueous wash liquid inert to the lignocellulosic material to obtain a delignified cellulosic material. The partially delignified pulp may then be bleached in accordance with any of the well-known conventional bleaching sequences. The recovered spent pulping liquor may be concentrated to a dissolved solids content ranging from 15% to 60% by weight. In the concentrated form, the spent pulping liquor may then be contacted, by known means, with any oxygen-containing reactants, which may suitably be air or other oxygen-containing gases, to produce and precipitate potassium sulphate. The potassium sulphate crystals may be recovered by conventional filtration or decantation of the reacted spent pulping liquor. The supernatant may be further concentrated and spray-dried, using any well-known techniques, to yield potassium lignosulphonate in powder form. Potassium lignosulphonate products are useful for, among other things, the control of the flow properties of oil well drilling fluids.

Alternatively, the whole spent pulping liquor may be concentrated and burned in a well-known smelter-type or fluid-bed furnace operating under oxidative conditions. The resulting products of combustion would be a mixture of potassium carbonate and potassium sulphate. This mixture can be used as a special fertilizer for use in acidic soils. This product may be marketed directly or may be dissolved in water to crystallize out the potassium sulphate. The remaining liquid the solute of which is composed mainly of potassium carbonate may be recycled for the preparation of the original cooking liquor.

In order to disclose more clearly the nature of the present invention, the following examples illustrating the invention are given.

EXAMPLE 1

A series of two bisulphite cooks were made in a 10-liter batch digester using 933 grams, on an oven-dried basis, of spruce/fir chips. The moisture in the chips was 531 grams. The cooks were all made with 4,000 grams of cooking liquor, with a composition of 4% total $SO_2$ and 2% free $SO_2$. In each cook, the heat-up time was 180 minutes from ambient temperature to a maximum temperature of 160 deg. C. The time at maximum temperature was 100 minutes.

After completion of the cooking, the cooking liquor was discharged from the digester and the chips were removed. The spent liquor drained from the discharged chips was collected for subsequent chemical analysis. The cooked chips were then broken up in a British disintegrator and the pulp was washed in a screenbox with a controlled quantity of water. The pulp was then centrifuged to remove excess water and the yield and Kappa number were determined. The pulp was later analyzed for physical strengths.

It is evident from an examination of Table I, that compared to conventional sodium base pulping, the present invention provides pulp of satisfactory yield and quality.

Table I

| Cook Number | 1 | 2 |
|---|---|---|
| Base | Na | K |
| g-mole per kg of oven-dry wood | 2.67 | 2.69 |
| g per kg of oven-dry wood | 61.52 | 104.72 |
| Total $SO_2$, g per kg of oven-dry wood | 171.49 | 171.49 |
| Total Pulp Yield, % on o.d. wood | 66.1 | 64.6 |
| Kappa Number | 110 | 116 |
| ISO Brightness, % | 45.3 | 44.6 |
| Physical Strengths at 500 CSF | | |
| Bulk, cm$^3$/g | 1.48 | 1.54 |
| Burst Index, kPa.m$^2$/g | 7.78 | 7.37 |
| Tear Index, mN.m$^2$/g | 5.98 | 6.11 |
| Breaking Length, km | 12.00 | 11.70 |
| Stretch, % | 2.89 | 2.72 |
| Physical Strengths at 300 CSF | | |
| Bulk, cm$^3$/g | 1.43 | 1.43 |
| Burst Index, kPa.m$^2$/g | 8.13 | 7.62 |
| Tear Index, mN.m$^2$/g | 5.85 | 5.86 |
| Breaking Length, km | 12.45 | 11.55 |
| Stretch, % | 2.93 | 2.92 |

Note: All tests were made in accordance with the established methods of the Technical Section of the Canadian Pulp and Paper Association.

Table II shows that with the present invention, inorganic sulphur compounds will be available in the form of sulphite for conversion by conventional means to sulphate. It is now possible with the present invention to manufacture valuable potassium sulphate, potassium carbonate and potassium lignosulphonate.

TABLE II

| Cook Number | 1 | 2 |
|---|---|---|
| Base | Na | K |
| Spent Liquor (conc. in mg/l) | | |
| Na | 10,240 | 800 |
| K | 1,080 | 13,800 |
| $SO_3$ | 20,080 | 21,210 |
| $SO_4$ | 2,800 | 3,240 |
| $S_2O_3$ | 1,310 | 2,060 |
| $CO_3$ | nil | nil |
| Total Carbohydrates, as Glucose | 12,500 | 12,340 |
| UV (280 nm) Lignin | 36,000 | 40,000 |
| Dissolved Fixed Solids | 32,350 | 39,460 |
| Dissolved Volatile Solids | 66,445 | 65,515 |
| pH | 3.35 | 3.30 |

Note: All tests were made according to established methods of the Technical Association of the Pulp and Paper Industry and the Technical Section of the Canadian Pulp and Paper Association.

EXAMPLE 2

A series of four alkaline cooks were made in a 10-liter batch digester using 480 grams, on an oven-dried basis, of wheat straw. The cooks were made at a liquor to wood ratio of 15.0 to 1.0. The total alkali charge on wood was 20.0% on oven-dried straw. When $SO_2$ was used, the pH of the cooking liquor was set at 10.0. In each cook, the heat-up time from ambient temperature to maximum temperature was 45 minutes. The maximum temperature was 170 deg. C. The time at maximum temperature was 30 minutes.

After completion of the cooking, the cooking liquor was discharged from the digester and the pulp fibres were removed. The spent liquor drained from the discharged pulp was collected for subsequent chemical analysis. The cooked fibres were then broken up in a British disintegrator and the pulp was washed in a screenbox with a controlled quantity of water. The pulp was later centrifuged to remove the excess water and the yield and Kappa number were determined. The pulp was also analyzed for physical strengths.

It is demonstrated from data given in Table III, that compared to conventional sodium base pulping, the present invention provides pulp of satisfactory yield and quality. And it follows that the spent pulping liquor can be processed by known means to recover potassium lignosulphonate, potassium sulphate and potassium carbonate, and combinations thereof.

TABLE III

| Cook Number | 3 | 4 | 5 | 6 |
|---|---|---|---|---|
| Base | Na | K | Na | K |
| Sulphur dioxide added | no | no | yes | yes |
| Total pulp yield, % on o.d. straw | 42.5 | 42.1 | 52.4 | 51.7 |
| Kappa number | 14.7 | 12.5 | 25.5 | 28.7 |
| Elrepho Brightness, % | 39.6 | 38.1 | 39.1 | 38.1 |
| Physical Properties at 150 CSF | | | | |
| Bulk, cm$^3$/g | 0.67 | 0.56 | 0.67 | 0.67 |
| Burst Index, kPa.m$^2$/g | 6.9 | 5.0 | 5.2 | 5.0 |
| Tear Index, mN.m$^2$/g | 4.7 | 5.7 | 4.5 | 5.0 |
| Breaking Length, km | 10.1 | 9.6 | 9.5 | 9.8 |
| Stretch, % | 1.8 | 1.7 | 1.6 | 1.6 |

Note: All tests were made according to established methods of the Technical Association of the Pulp and Paper Industry.

While the present invention has been described herein with reference to specific embodiments, various modifications and variations of the inventive process will be apparent to those skilled in the art. It is intended therefore that this invention be limited only by the claims which follow.

The embodiments of the invention in which an exclusive property or privilege is claimed are defined as follows:

1. A process for producing a potassium salt, selected from the group consisting of potassium carbonate, potassium sulphate, potassium lignosulfonate and combinations thereof, from a potassium-base aqueous cooking liquor used in the pulping of a lignocellulosic material which comprises:
   (a) digesting the lignocellulosic material with the potassium-base aqueous cooking liquor to obtain an aqueous slurry, the slurry comprising partially delignified pulp of said lignocellulosic material and spent pulping liquor and the potassium-base cooking liquor comprising potassium sulphite, potassium bisulphite, potassium sulfide or combinations thereof;
   (b) treating the aqueous slurry to separate the spent pulping liquor from said pulp;
   (c) concentrating and oxidizing the spent pulping liquor without substantially changing the sulphidity of the spent pulping liquor to produce a concentrated, oxidized pulping liquor; and
   (d) recovering from the concentrated, oxidized pulping liquor the potassium salt.

2. A process as in claim 1, wherein the cooking liquor further comprises potassium hydroxide, potassium carbonate, or combinations thereof.

3. A process as in claim 2, wherein the recovering of the potassium salt comprises precipitating potassium sulphate from the concentrated, oxidized pulping liquor, and recovering the potassium sulphate and residual concentrated, oxidized pulping liquor.

4. The process of claim 3 wherein the residual concentrated, oxidized pulping liquor is further concentrated to recover potassium lignosulfonate.

5. A process according to claim 1 or claim 2, wherein the spent pulping liquor is concentrated to a dissolved solids content ranging from 15% to 60% by weight of said liquor.

6. A process according to claim 5 wherein oxidizing comprises burning the concentrated spent pulping liquor under oxidative conditions to produce a solid product consisting principally of a mixture of potassium carbonate and potassium sulphate.

7. A process according to claim 3 wherein, the residual concentrated oxidized pulping liquor, the solute of which is principally potassium carbonate, is recycled for preparation of the cooking liquor.

8. The process of claim 3 wherein the residual concentrated, oxidized pulping liquor is further concentrated and is spray-dried to recover potassium lignosulfonate in powder form.

9. A process in accordance with claim 3, wherein oxidizing comprises contacting with an oxygen-containing gas to effect oxidation and thereby produce potassium sulphate.

10. The process of claim 9 wherein the oxygen-containing gas is air.

11. The process of claim 6, further comprises the leaching of the mixture of potassium carbonate and potassium sulphate, to remove the potassium carbonate and leave behind the potassium sulphate.

* * * * *